(12) United States Patent
Cadogan et al.

(10) Patent No.: US 6,508,036 B1
(45) Date of Patent: Jan. 21, 2003

(54) METHOD OF LINEAR ACTUATION BY INFLATION AND APPARATUS THEREFOR

(75) Inventors: David P. Cadogan, Middletown, DE (US); John K. Folke, Harrington, DE (US); John K. Lin, Middletown, DE (US); Charles R. Sandy, Camden, DE (US)

(73) Assignee: ILC Dover, Inc., Frederica, DE (US)

( * ) Notice: Subject to any disclaimer, the term of this patent is extended or adjusted under 35 U.S.C. 154(b) by 0 days.

(21) Appl. No.: 09/700,054

(22) PCT Filed: Mar. 21, 2000

(86) PCT No.: PCT/US00/07346

§ 371 (c)(1), (2), (4) Date: Nov. 9, 2000

(87) PCT Pub. No.: WO00/57685

PCT Pub. Date: Oct. 5, 2000

Related U.S. Application Data (60) Provisional application No. 60/125,629, filed on Mar. 22, 1999.

(51) Int. Cl.$^7$ .............................. E04C 3/00; E04H 12/18
(52) U.S. Cl. ........................... 52/2.13; 52/2.21; 52/108; 52/645; 52/741.1; 52/750
(58) Field of Search ........................... 52/1, 2.13, 2.21, 52/645, 741.1, 750, 108

(56) References Cited

U.S. PATENT DOCUMENTS

| | | | |
|---|---|---|---|
| 3,811,633 A | * 5/1974 | Cummings et al. | ....... 52/108 X |
| 4,065,888 A | 1/1978 | Napierski | |
| 4,480,415 A | * 11/1984 | Truss | ........................... 52/108 |
| 4,532,742 A | * 8/1985 | Miura | ........................... 52/108 |
| 4,587,777 A | * 5/1986 | Vasques et al. | ................ 52/108 |
| 4,662,130 A | * 5/1987 | Miura et al. | ................... 52/108 |
| 4,918,884 A | * 4/1990 | Okazaki et al. | ................ 52/108 |
| 5,154,027 A | * 10/1992 | Warden | ........................ 52/108 |
| 5,311,706 A | * 5/1994 | Sallee | ......................... 52/2.18 |
| 5,489,119 A | 2/1996 | Prescaro et al. | |
| 5,711,495 A | 1/1998 | Danielson | |
| 5,820,773 A | 10/1998 | Hintzman et al. | |
| 5,871,180 A | 2/1999 | Hublikar | |
| 5,875,868 A | 3/1999 | Smialowicz et al. | |
| 5,906,340 A | 5/1999 | Duggal | |

FOREIGN PATENT DOCUMENTS

WO 00057685 10/2000

OTHER PUBLICATIONS

"Inflatable Space Structures: A New Paradigm for Space Structure Design"; Cadogan et al; 49th International Astronautical Congress, Sep. 28–Oct. 2, 1998; Melbourne, Australia; pp. 1–8.

"Deployment Control Mechanisms for Inflatable Space Structures", Cadogan et al; 33rd Aerospace Mechanisms Conference; May 1999; pp. 1–11.

"Inflatable Boom Controlled Deployment Mechanism for the Inflatable Sunshield in Space (ISIS) Flight Experiment"; Sapna III et al; 34th Aerospace Mechanisms Conference; May 11–13, 2000; NASA GSFC, Greenbelt, Maryland; pp. 1–8.

* cited by examiner

*Primary Examiner*—Robert Canfield
(74) *Attorney, Agent, or Firm*—Stevens, Davis, Miller & Mosher, L.L.P.

(57) ABSTRACT

A method and lightweight apparatus (100) that provide linear actuation effected by the controlled inflation of a deployable tube (120) permits the deploying end (125) of the tube (120) to be guided out in a linear motion by a yoke (140) that constrains the inflated portion of the tube (120) immediately behind it A means for imparting resistance to deployment facilitates a smooth actuation by controlling both the rate and the directionality of deployment, and by maintaining a uniform internal pressure in the tube being deployed. A frame assembly (180) at the deploying end (125) of the tube (120) can be configured to interface with a variety of components to be linearly deployed.

13 Claims, 8 Drawing Sheets

METHOD OF LINEAR ACTUATION BY INFLATION AND APPARATUS THEREFOR

This application claims the priority of U.S. Provisional Application No. 60/125,629 filed Mar. 22, 1999, and incorporated herein by reference.

BACKGROUND OF THE INVENTION

1. Field of the Invention

This invention relates generally to a method and apparatus that provide linear actuation effected by the controlled inflation of a deployable tube. The invention relates more specifically to a method and lightweight apparatus that provide linear actuation for use in the deployment of very lightweight space structures such as solar arrays, reflectors, sunshields, radar arrays, antennas, and concentrators.

2. Description of Related Art

Most conventional methods for deploying a space structure accomplish the deployment by means of deployable truss structures consisting of relatively heavy elements such as rigid members, hinges, latches, and cables. Increases in the number of satellites to be launched over the next several decades, however, will emphasize the need for the reduction of space hardware mass, stowage volume, and cost. One approach to realizing these reductions is through the use of inflatable, deployable, space structures. Inflatable structures offer many benefits over conventional deployable structures because they are lower in mass and can be packaged into small volumes, which reduces launch vehicle size and cost. The performance benefit margin of inflatable structures increases as the size of the structure increases, thus making the technology more attractive for large-scale systems. Examples of satellite components that benefit from the utilization of inflatable structures include solar arrays, communications antennas, radar antennas, thermal/light shields, and solar sails.

A critical component of the inflatable structure is the means for control of the deployment process. The deployment of inflatable structures in space to date has demonstrated the need for improvements in deployment control. For example, inflatable space structures have been used in space since the late 1950's when the first balloon satellites were flown. Balloon satellites, such as the 30 m diameter ECHO series, were deployed from a 0.67 m diameter packing container using inflation gas. The deployment event of the balloon satellites was uncontrolled and depended only on the packing method used. Over thirty-two launches of inflatable spheres occurred during the period from 1958 to 1971 with some remaining in orbit for over eleven years. Several of the early balloon satellites failed during the inflation event. Some of these failures were attributed to lack of control of the inflation process. Modifications were made to the packing and inflation procedure which lead to success with subsequent flights. This was the first experience with design modification to ensure deployment success. Balloon satellites, by nature of their spherical geometry, facilitated this type of a solution to obtain a controlled deployment.

The controlled deployment of inflatable structures having more complex geometric shapes such as beams and toroids has required more elaborate solutions. In 1996, NASA and the Jet Propulsion Laboratory flew the Inflatable Antenna Experiment ("IAE") on STS-77. This experiment was conceived to verify the accuracy of an inflatable off-axis parabolic lenticular antenna structure deployed in space. The system consisted of a 14 m lenticular, supported around its perimeter by an inflatable torus. This assembly was attached to the parent spacecraft by three 28 m inflatable struts. The IAE was packed with the struts z-folded and packaged between the folded lenticular structure and a kick-plate. Once the outer doors were opened and verified in place, a command was sent to the kick-plate that was to exert an impulse force on the packed structure. While it had been envisioned that this impulse force would extend the structure to approximately 90% of its length, thus facilitating a linear inflation path. the packed inflatable structure instead extended out of the container and away from the kick-plate. This phenomena was attributed to residual inflation gas within the structure that caused it to auto-inflate and begin the unfolding of the assembly. Another cause of this phenomena was the residual stress in the membranes at each of the packaging folds. This stress caused the z-folds to open slightly, in the same manner as a spring, and move the package away from the kick-plate. Therefore, once the kick-plate was fired, the packed inflatable was no longer resting against it, and no effect was noted.

The loss of the impulse force input and subsequent extension of the structure led to an uncontrolled deployment. During the deployment the spacecraft was pitched in various directions but returned to near its original orientation when the inflation was complete. This deployment demonstrated that significant impulse forces could be imparted to the spacecraft and that the inflatable could violate set zones of exclusion around the spacecraft if the deployment was not controlled.

Thus, to achieve a controlled deployment, it is necessary to control the rate of deployment, control the directionality of deployment, and maintain a uniform internal pressure in the structure during deployment. Control of the rate and smoothness of deployment is important in order to limit impulse forces and moments which may be imparted to the parent craft or the device being deployed. Control of the rate is also important because changes in the rate will yield large volume changes which affect the internal pressure and thus the system rigidity during deployment.

Control of the directionality of deployment is of particular importance with inflatable structures because without strict control, their path during inflation can be random and chaotic. The means for control must dictate the path of deployment and ensure that zones of exclusion around the spacecraft, such as, for example, areas populated by solar arrays or instruments, are not violated.

Successful operation of an actuation apparatus depends on maintaining the stiffness of the inflatable tube while the tube is being deployed. Because the rigidity of the structure is derived from the tensile stress in its walls, and is proportional to the internal pressure, maintaining a pressurized column of gas from the source of inflation to the point of deployment control will maintain rigidity during deployment. To achieve this rigidity, however, it is necessary to provide sufficient resistance to deployment such that the internal pressure required to continue deployment is high enough to adequately stiffen that portion of the tube which has already been deployed.

Therefore, a general need exists for a method of linear actuation effected by the inflation of a deployable tube. A more specific need exists for a method and lightweight apparatus capable of facilitating the actuation by controlling both the rate and the directionality of deployment, and by maintaining a uniform internal pressure in the structure being deployed.

As indicated above, most conventional methods for deploying and supporting a space structure accomplish the deployment by means of deployable truss structures consisting of relatively heavy elements such as rigid members, hinges, latches, and cables. increases in the number of satellites to be launched over the next several decades, however, will emphasize the need for the reduction of space hardware mass, stowage volume, and cost.

Inflatable structures offer many benefits over conventional deployable structures because they are lower in mass and can be packaged into small volumes, which reduces launch vehicle size and cost. The performance benefit margin of inflatable structures increases as the size of the structure increases, thus making the technology more attractive for large-scale systems. Examples of satellite components that benefit from the utilization of inflatable structures include solar arrays, communications antennas, radar antennas, thermal/light shields, and solar sails.

Although inflatable tubular structures weigh less than deployable truss structures consisting of elements such as rigid members, hinges, latches, and cables, the weight of the inflatable tubular structures is not insignificant.

Therefore, a need exists for a method and an apparatus capable of facilitating the deployment, and subsequent support, of a space structure, but which can do so with an overall apparatus weight which is less than that of conventional inflatable deployment structures.

SUMMARY OF THE INVENTION

It is an object of the present invention to provide a method and apparatus that provide linear actuation effected by the inflation of a deployable tube. It is a further object of the present invention to provide a method and lightweight apparatus capable of facilitating the actuation by controlling both the rate and the directionality of deployment, and by maintaining a uniform internal pressure in the structure being deployed.

Accordingly, the present invention advantageously employs a lightweight actuation apparatus that permits the deploying end of a tube to be guided out in a controlled, linear motion by a yoke that bears on, or constrains, the inflated portion of the tube immediately behind the apparatus.

The apparatus comprises a frame assembly that is attached to a first, deployable end of an inflatable tube, and a fixed second end of the inflatable tube that is attached to a mounting surface, typically a spacecraft bus or satellite. Inflation gas is introduced into the tube at its fixed second end. As the tube inflates, it deploys in a linear manner so as to extend its length. The actuation apparatus allows the deploying end of the tube to extend while it is guided out in a controlled linear motion by a yoke that bears on, or constrains, the inflated portion of the tube immediately behind the apparatus.

The frame assembly can be configured to interface with a variety of components to be linearly deployed. Typically, this component to be deployed is one or more membranes that comprise the space structure, which may be, for example, a solar array, reflector, sunshield, radar array, antenna, or concentrator.

The apparatus is compatible with inflatable tubes made of various rigidizable materials such that, if desired, the inflated tube, once deployed with this apparatus, can be rigidized and made self-supporting without internal pressurization.

The advantages associated with the present invention are numerous. First, as indicated above, most conventional methods for deploying a space structure accomplish the deployment by means of deployable truss structures consisting of heavy elements. The present invention, however, provides a lightweight means for both deploying and, if desired, supporting a variety of space structures. In a preferred method of actuation, the apparatus allows the unrolling motion of an inflating tube to accomplish linear actuation on the membranes to be deployed, thus avoiding the need for the membranes themselves to be rolled up with the tube in order to be deployed. By virtue of its inflatable means for deployment and optional rigidizable means for support, the invention comprises a lighter-weight system with fewer moving parts, thereby providing a higher degree of system reliability.

Thus, while specifically facilitating as its primary application the deployment of very lightweight space structures, the invention also more generally provides for the deployment of any lightweight structure which can then be maintained in place by the rigidity of the inflatable tube.

BRIEF DESCRIPTION OF THE DRAWINGS

Other objects, features. and advantages of the present invention will become more fully apparent from the following detailed description of the preferred embodiments. the appended claims, and the accompanying drawings. As depicted in the attached drawings:

DESCRIPTION OF THE PREFERRED EMBODIMENTS

The present invention will be disclosed in terms of the currently perceived preferred embodiments thereof. In FIGS. 1–7, the deployable tube is depicted as an originally coiled, unrollable, tube. As one skilled in the art can appreciate, however, other configurations of deployable tube are encompassed by the present invention, such as, for example, as described in greater detail below, an accordian-like, stacked configuration.

Figure 1:
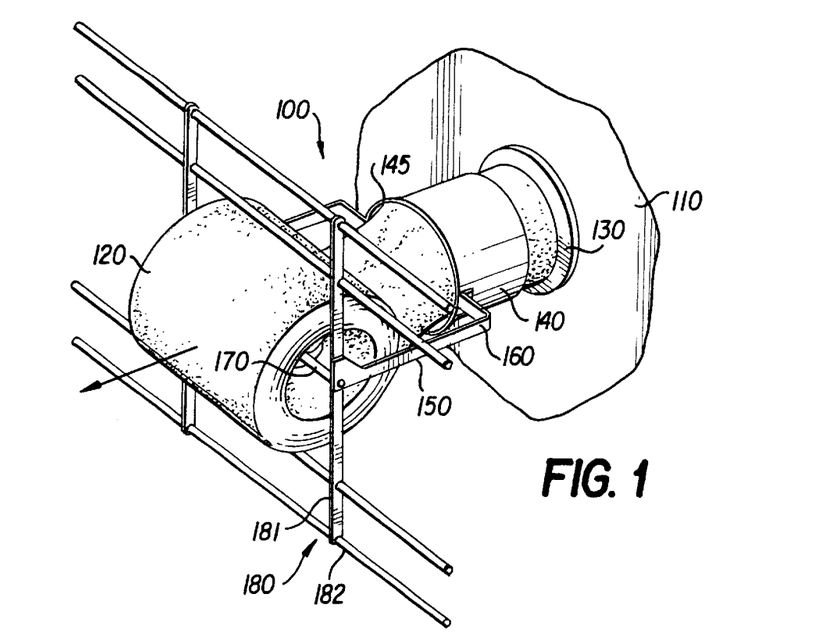
FIG. 1 is a perspective view of a linear actuation apparatus constructed in accordance with the teachings of a first preferred embodiment of the present invention in which the apparatus is in its stowed position.
Figure 2:
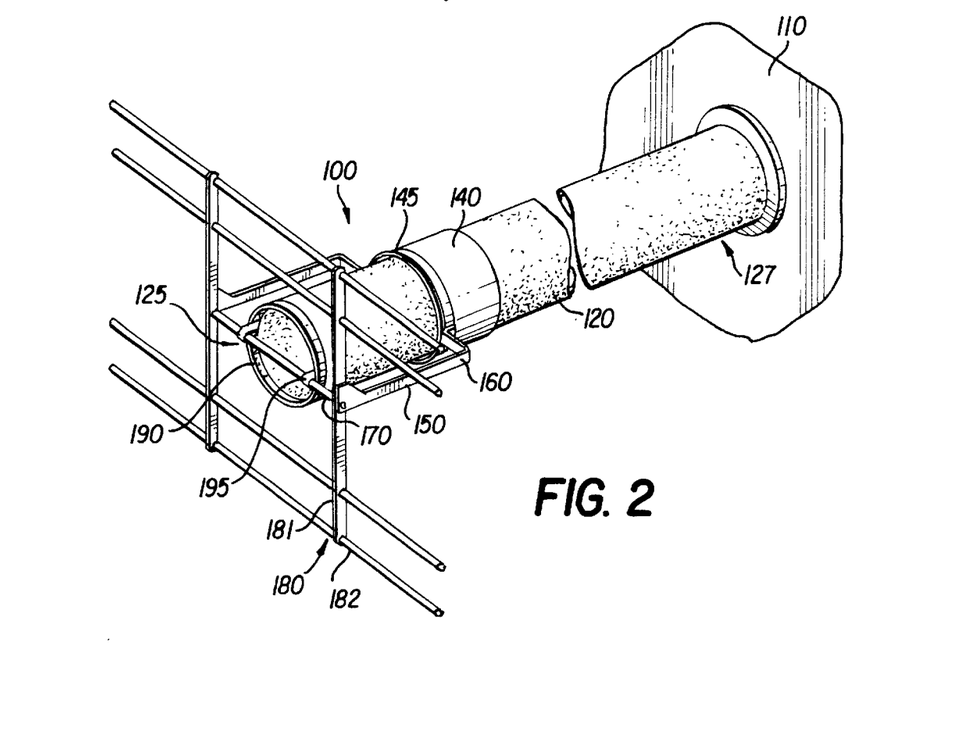
FIG. 2 is a perspective view of a linear actuation apparatus constructed in accordance with the teachings of the first preferred embodiment of the present invention in which the apparatus is in its deployed position.

Referring to FIGS. 1 and 2, a linear actuation apparatus 100 constructed in accordance with a first preferred embodiment of the present invention is shown in its stowed and deployed positions, respectively, in operative cooperation with a mounting surface 110. In this embodiment, the linear actuation apparatus 100 comprises a rigid end cap 190 mounted in a first, deployable, unrolling end 125 of an inflatable tube 120, and a fixed second end 127 of the inflatable tube 120 attached to mounting surface 110. This end cap 190 includes rotational end cap shaft bearings 195 through which an end cap shaft 170 extends across the diameter of the end cap. This shaft 170 connects at both ends to a lightweight frame assembly 180 such that the end cap 190, centered on the shaft 170, is centered in the frame 180. The shaft 170 is slightly longer than half the circumference of the inflatable tube 120 so that when the tube is flattened and rolled, the roll width fits within the frame assembly 180.

The frame assembly 180 also comprises first and second horizontally-opposed vertical support members 181 and crosspieces 182. The frame assembly 180 is connected to first and second horizontally-opposed yoke extension brackets 150 that connect the assembly to a tubular sleeve, or yoke 140 that surrounds the inflatable tube immediately behind the apparatus. This yoke 140 is a lightweight, thin tube that is slightly larger in diameter than the inflated diameter of the tube. The yoke 140 has a flared leading edge 145 that enables the yoke to slide readily along the inflatable tube during deployment. The yoke 140 is connected to each of the frame extension brackets extension brackets 150 at first and second horizontally-opposed pivots 160. These pivots 160 allow the frame and shaft to rotate off the axis of the inflatable tube. This is necessary because, during inflation, the body of the rolled-up, undeployed tube material seeks a position such that the outer diameter of the coiled tube, or roll, is tangent to the axis of the portion of tube that has already inflated. The pivot between the yoke and bracket enables the roll to take this position without inducing a binding condition between the yoke and the inflatable tube.

In an optional embodiment, the yoke comprises a pair of opposed rollers which enable the yoke to roll readily along the inflatable tube during deployment.

When inflation gas is introduced into the inflatable tube, deployment, or unrolling of the tube, begins. The end cap 190 rotates relative to the end cap shaft 170 through rotation of the end cap shaft bearings 195. The unrolling and extending inflatable tube produces axial force on the end cap shaft 170, which then imparts this force to the frame assembly 180. The frame assembly 180 itself does not rotate with the tube, however, because it is restrained from rotating by its connection to the sliding yoke 140, which bears on, or constrains, that portion of the inflatable tube that has inflated immediately behind the yoke.

Figure 3:
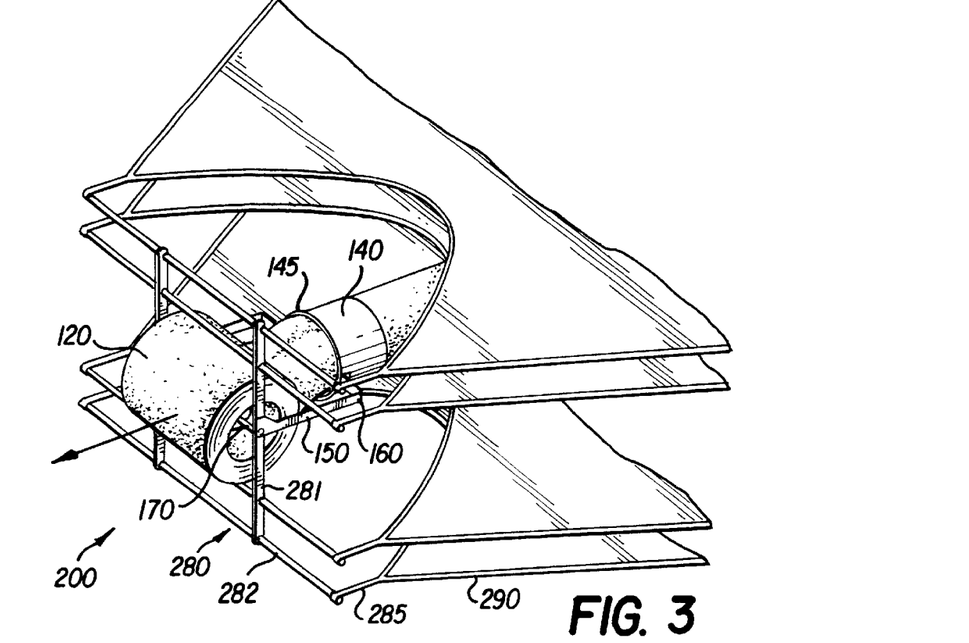
FIG. 3 is a perspective view of a linear actuation apparatus constructed in accordance with the teachings of a second preferred embodiment of the present invention in which the apparatus is used to deploy one or multiple membranes and in which the apparatus is in its stowed position.
Figure 4:
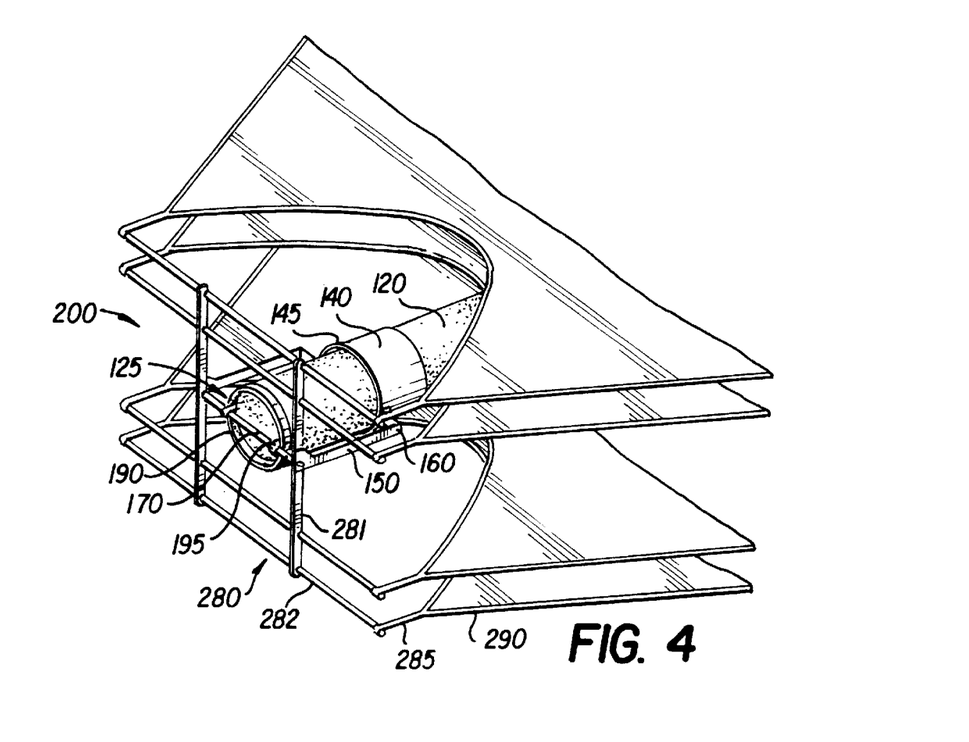
FIG. 4 is a perspective view of a linear actuation apparatus constructed in accordance with the teachings of the second preferred embodiment of the present invention in which the apparatus is used to deploy one or multiple membranes and in which the apparatus is in its deployed position.

Referring to FIGS. 3 and 4, a linear actuation apparatus 200 constructed in accordance with a second preferred embodiment of the present invention is shown in its stowed and deployed positions, respectively, in operative cooperation with membranes 290. In this embodiment, the linear actuation apparatus 100 is configured to deploy one or more multiple membranes. The frame assembly 280 comprises springs 285 at each of the first and second ends of each of the assembly's crosspieces 282 in order to apply tension to the deployed membranes 290.

Figure 5:
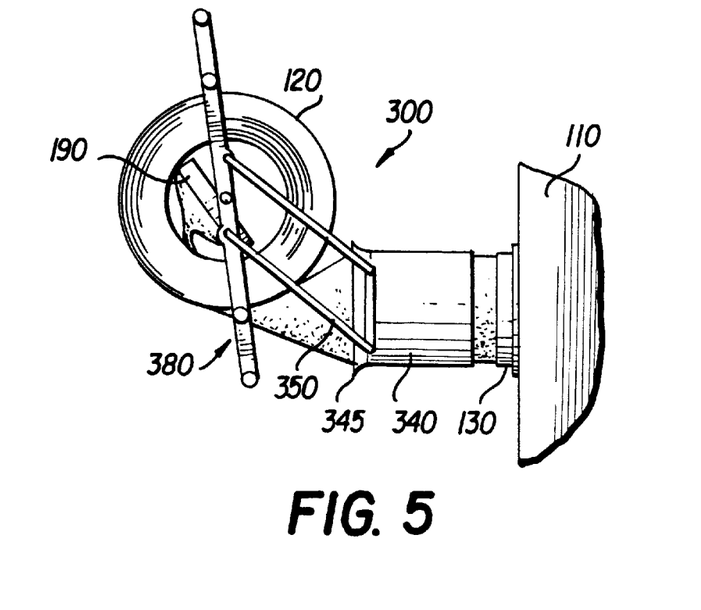
FIG. 5 is an elevation view of a linear actuation apparatus constructed in accordance with the teachings of a third preferred embodiment of the present invention in which the frame of the apparatus is connected to a yoke with two pivoting arms on each side and in which the apparatus is in its stowed position.
Figure 6:
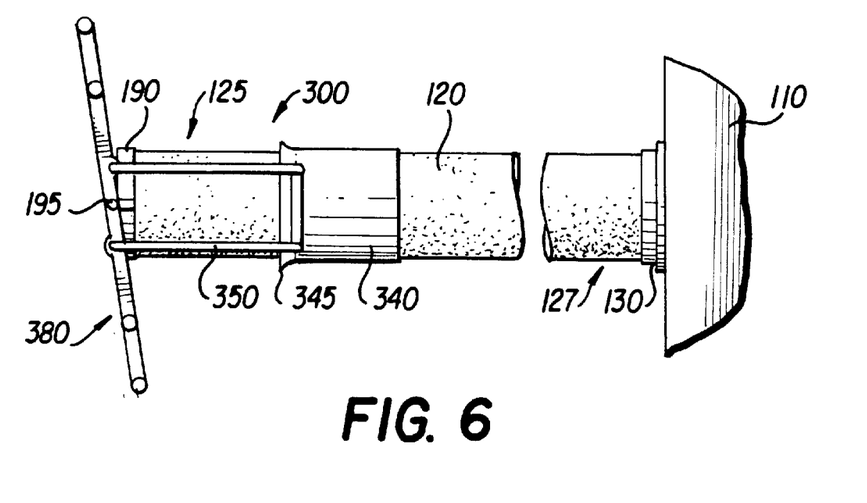
FIG. 6 is an elevation view of a linear actuation apparatus constructed in accordance with the teachings of the third preferred embodiment of the present invention in which the frame of the apparatus is connected to a yoke with two pivoting arms on each side and in which the apparatus is in its deployed position.

Referring to FIGS. 5 and 6, a linear actuation apparatus 300 constructed in accordance with a third preferred embodiment of the present invention is shown in its stowed and deployed positions, respectively, in operative cooperation with a mounting surface 110. In this embodiment, the linear actuation apparatus 100 is configured for applications where it may be important to maintain the orientation of the frame relative to the inflatable tube axis during deployment. The frame assembly 380 is connected to the yoke 340 with upper and lower pivoting first and second horizontally-opposed yoke extension brackets 350. This four-bar linkage arrangement is similar to that found in a pantograph apparatus and can be used in applications where it may be important to maintain the orientation of the frame relative to the inflatable tube axis during deployment.

Figure 7:
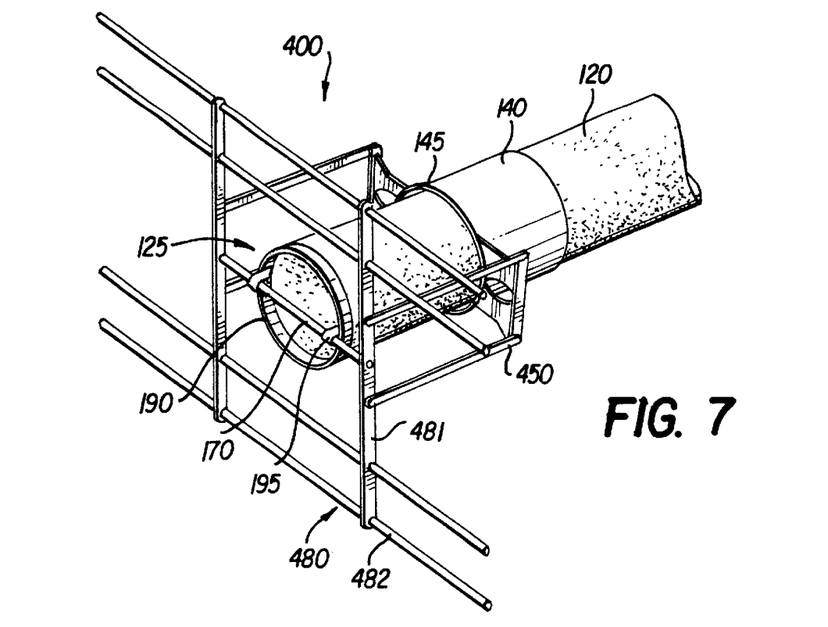
FIG. 7 is a perspective view of a linear actuation apparatus constructed in accordance with the teachings of a fourth preferred embodiment of the present invention in which the yoke extension bracket is configured as a pantograph.

Referring to FIG. 7, a linear actuation apparatus 400 constructed in accordance with a fourth preferred embodiment of the present invention is shown in which the yoke extension bracket 450 is configured as a pantograph. In this embodiment, the frame assembly 480 is connected to the yoke 140 with upper and lower first and second horizontally-opposed yoke extension brackets 450.

Figure 8:
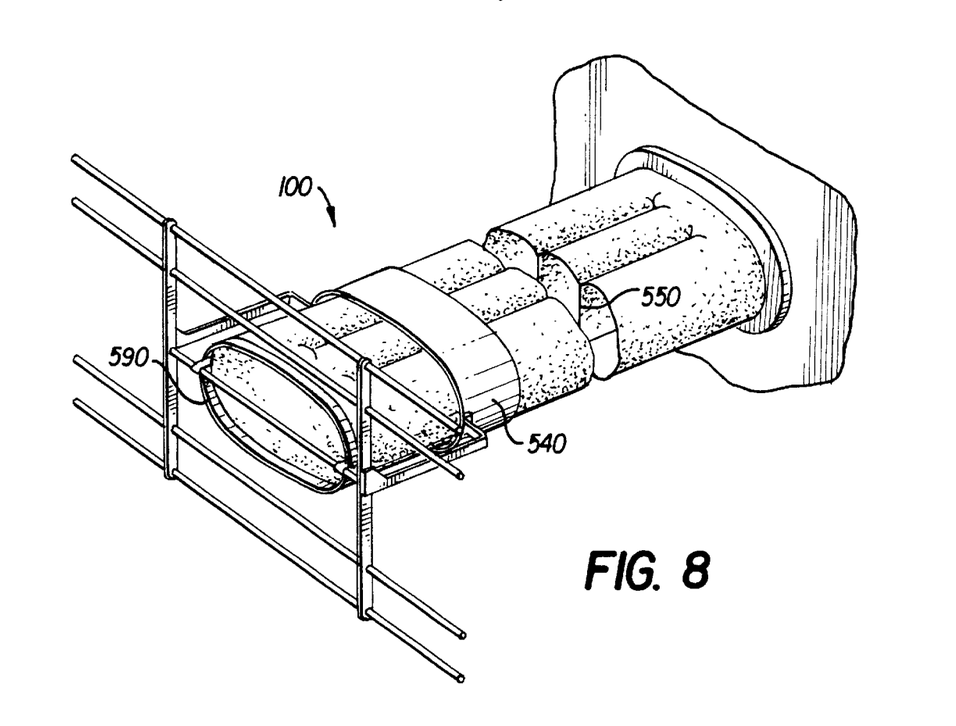
FIG. 8 is a perspective view of a linear actuation apparatus constructed in accordance with the teachings of a fifth preferred embodiment of the present invention in which the tube has a non-circular cross-sectional shape.

The use of the term "tube" herein is meant to denote not only conduits of circular cross section, but also includes all other cross-sectional shapes which are capable of being deployed according to the present invention. For example, the use of internal fabric spars enable the approximation of non-circular cross-sectional shapes such as that depicted in FIG. 8. In FIG. 8, the the linear actuation apparatus 100 comprises a rigid non-circular end cap 590 and a non-circular yoke 540. Internal spars 550 facilitate the approximation of the non-circular cross-sectional shape of tube 520.

Regardless of which configuration of the frame assembly is being employed. successful operation of the actuation apparatus depends on maintaining the stiffness of the inflatable tube while the tube is being deployed. To achieve a controlled deployment, it is necessary to incorporate sufficient resistance to deployment such that the internal pressure required to continue deployment is high enough to adequately stiffen the portion of the tube that has already deployed.

Means for providing this resistance can be of two general types: columnation devices and roll-up devices. The columnation device is an accordian-like mechanism which allows an inflatable tube to grow linearly as a column, from a fixed base, and comprises a mandrel with an aspect ratio of greater than 1.0 (length to diameter), an inflatable tube, and a mounting base. The aspect ratio of greater than 1.0 ensures that the tube can deploy from the mandrel at an angle. The inflatable tube is drawn over the mandrel and stored behind it prior to deployment. Gas is introduced through the center of the mandrel into the tube to begin deployment. The build-up of pressure in the tube develops a plug-load on the tube wall and thus a longitudinal stress in the tube wall that pulls the tube from its stowed volume. The mandrel has circumferential seals that provide friction to the tube and retard its deployment. The seals prevent premature inflation of the stowed tube and determine the longitudinal stress, and therefore the rigidity during deployment, of the structure.

The roll-up embodiment of the present invention, which causes the least damage to the stowed tube and produces the smoothest deployment, comprises a rolled inflatable tube with a means for imparting resistance to deployment, i.e., a means for controlling the rate of unrolling when the inflation gas is introduced. The two general classes of deployment control which can be used in the roll-up embodiment include: i) means embedded in either the interior or exterior wall of the tube itself, and ii) means mounted at the deploying end of the tube.

Examples of the means for imparting resistance to unrolling which are embedded in the tube wall itself and which provide for adhesion of the rolled-up exterior tube wall surfaces to one another include a hook-and-loop fastener tape such as "VELCRO," and constant force springs. In each of these means, the rolled tube remains in its packed state until the inflation pressure overcomes the resistance provided by the means and initiates deployment.

In a first embodiment of the means for imparting resistance to unrolling, a plurality of hook-and-loop fasteners embedded in the exterior wall of the tube can be used to control deployment as well as assist in maintenance of the package shape during launch vibration. This is accomplished by adding four independent strips of hook-and-loop fastener to the tube's exterior: two strips of hook at the 10 and 2 o'clock positions, and two strips of loop at the 8 and 4 o'clock positions. The tube is then flattened and rolled about the 9 to 3 o'clock axis. When inflation gas is introduced, the tube expands, causing the hook on the top side of the tube to detach from the loop on the bottom side of the tube, thereby allowing the tube to unroll. By selecting various grades and widths of hook-and-loop fastener, resistance to unrolling can be predicted and controlled, thus yielding the internal pressure required to provide the specified tube stiffness.

In a second embodiment of the means for imparting resistance to unrolling, a plurality of constant force springs can be embedded in a closed channel on the tube's interior wall at the 10 and 2 o'clock positions. The spring force, dictated by the selection of the spring, determines the pressure required to deploy the tube and thus its structural rigidity during deployment.

In a preferred embodiment of the means for imparting resistance to unrolling, however, a means for imparting mechanical torque is located at the deploying end of the tube. The means requires the application of torque in order to rotate the end cap about the shaft bearing, but does not impart any rotational force to the static shaft itself. This means can be, for example, a frictional device or a ratchet mechanism, but is, in a preferred embodiment, a means for imparting torque through plastic deformation of a wire or tape of material.

Figure 9:
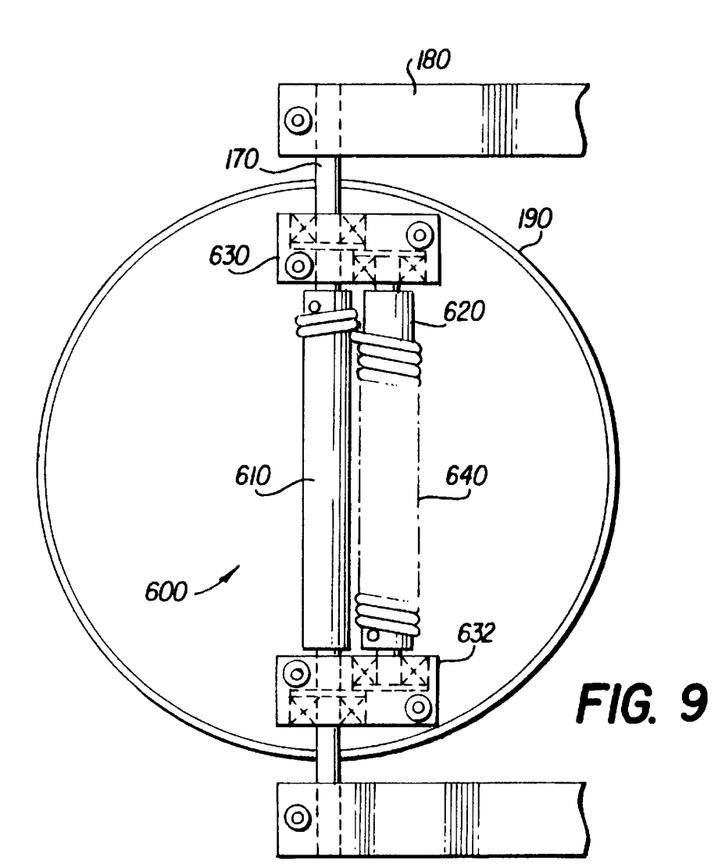
FIG. 9 is a top view of a rotational brake mechanism for controlling the rate of unrolling of a tube.

A more preferred means for imparting torque is a rotational brake mechanism 600, the details of which are depicted in FIG. 9. The rotational brake mechanism is especially compatible with inflatable tubes employed with space inflatable structures because the mechanism is lightweight. reliable, has a smooth and predictable motion. and is compatible with numerous tube materials and configurations. Rotational brake mechanism 600 is attached to rigid end cap 190 (shown in a position that is perpendicular to its final resting position when the tube is fully deployed) mounted in the first, deployable, unrolling end 125 of inflatable tube 120. Rotational brake mechanism 600 comprises a take-up spool 610, supply spool 620, first and second spool housings 630 containing bearings 632, and ductile wire 640. First and second spool housings 630 are supported by means of end cap shaft 170 which connects at each end to frame assembly 180, and are attached to end cap 190. Both take-up spool 610, which is positioned on the centerline of tube 120 and serves as the center of rotation for the rotational brake mechanism during deployment of the tube, and supply spool 620 terminate in bearings 632 which are mounted in the housings 630.

As inflation gas is introduced into tube 120, the tube begins to unroll, causing end cap 190 to rotate about end cap shaft 170. Ductile wire 640, which is initially wound around supply spool 620, is deformed during the process of transferring from the supply spool to take-up spool 630. This deformation expends energy and causes a torque to be imparted about end cap shaft 170. This torque is imparted through frame assembly 180 to the pressurized portion of tube 120, and controls the rate at which the tube is allowed to unroll.

Selection of both the material of the wire and the thickness of the wire determine the amount torque that is imparted by the shaft. Furthermore, the use of the term "wire" herein is meant to denote not only continuous materials of circular cross section, but also includes all other continuous materials having a cross-sectional shape which is capable of being transferred from the supply spool to the take-up spool. The material could be, for example, a ductile tape wrapped upon itself on the supply spool. Finally, the path of the winding can also be altered so as to change the resistance provided, such as by employing multiple spools or by winding from exterior to exterior of the spools instead of from exterior to interior.

Figure 10:
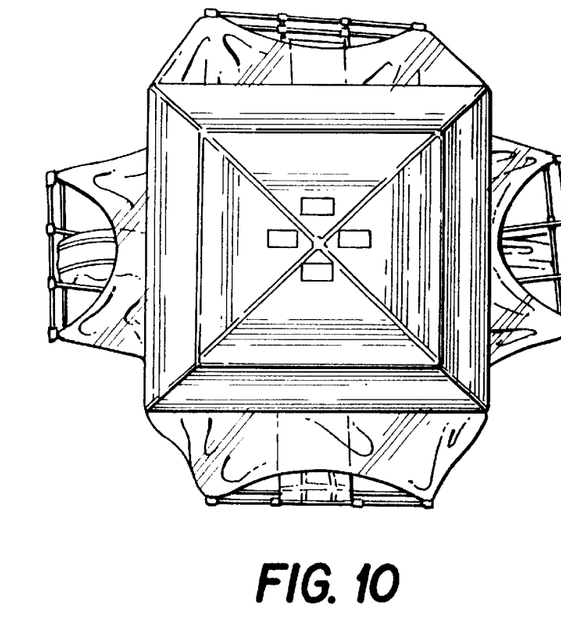
FIG. 10 is a digital image of a spacecraft bus in which four linear actuation apparatuses are in the stowed position.
Figure 11:
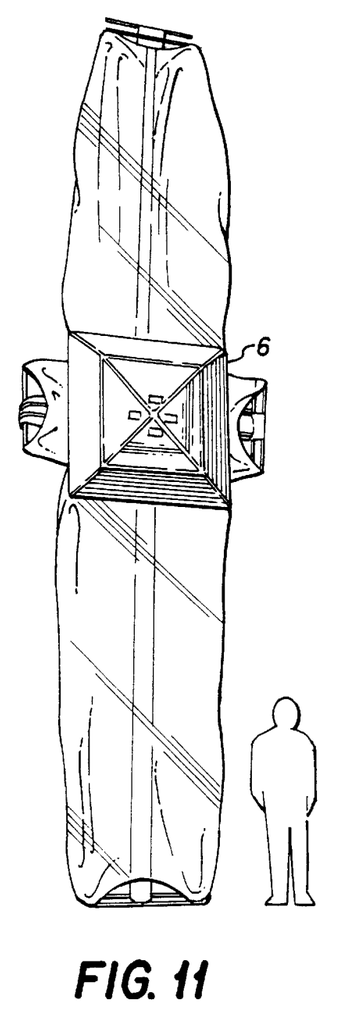
FIG. 11 is a digital image of the spacecraft bus in which opposed first and second linear actuation apparatuses have fully deployed a first membrane in the y axis.
Figure 12:
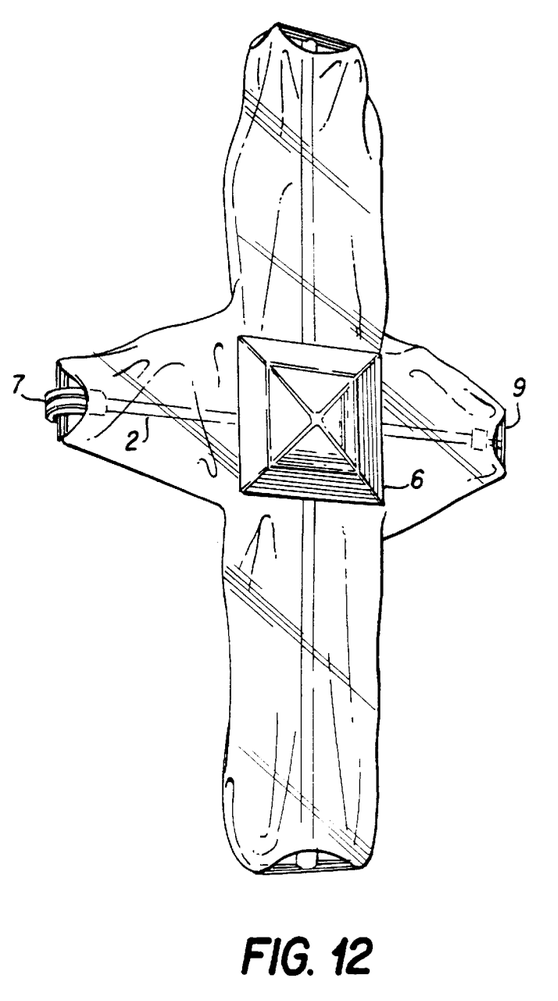
FIG. 12 is a digital image of the spacecraft bus in which opposed third and fourth linear actuation apparatuses have partially deployed a second membrane in the x axis.
Figure 13:
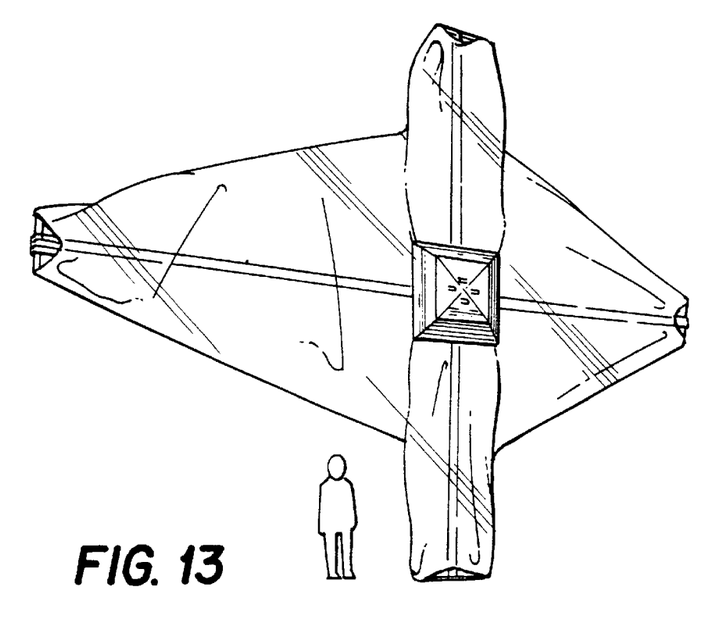
FIG. 13 is a digital image of the spacecraft bus in which the third and fourth linear actuation apparatuses have more partially deployed the second membrane in the x axis.
Figure 14:
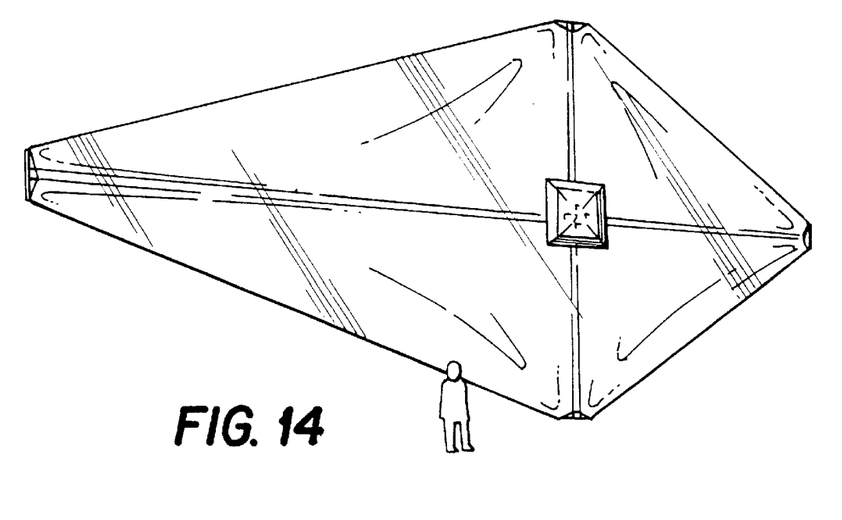
FIG. 14 is a digital image of the spacecraft bus in which the third and fourth linear actuation apparatuses have fully deployed the second membrane in the x axis.

FIGS. 10–14 are digital images of a half-scale prototype membrane-type space structure deployed according to the method of the present invention. FIG. 10 depicts a spacecraft bus comprising opposed first and second linear actuation apparatuses for deployment in the y axis, and opposed third and fourth linear actuation apparatuses for deployment in the x axis. In FIG. 10, the four linear actuation apparatuses are in the stowed position. In FIG. 11, the first and second linear actuation apparatuses have fully deployed a first membrane in the y axis. In FIG. 12, the third and fourth linear actuation apparatuses have partially deployed a second membrane in the x axis, in FIG. 13 the third and fourth linear actuation apparatuses have more partially deployed the second membrane in the x axis, and in FIG. 14, the third and fourth. linear actuation apparatuses have fully deployed the second membrane in the x axis.

In a further configuration embodiment, it may be desirable to deploy only the inflated tube, as in as in certain antennae applications. In such an embodiment, however, the use of flexible components on the tube, e.g., hook-and-loop fastener tape, is not feasible if multi-layer insulation is used on the inflated tube. Similarly, constant force springs are not feasible because they add mass and continue to load the tube after deployment is complete. Therefore, the linear actuation apparatus could be used in conjunction with a device such as the aforementioned rotational brake mechanism to provide resistance and control the deployment of the tube. In this embodiment, the shaft would connect directly to the yoke extension brackets without a separate frame structure.

The apparatus of the present invention is compatible with inflatable tubes made of various in situ rigidizable materials such that if desired. the inflated tube, once deployed with this apparatus, can be rigidized and made self-supporting without internal pressurization. In other words, the materials are densely packaged for launch in a flexible state, deployed to shape with inflation gas once on orbit, and then made rigid. Once rigidization is complete, the tube is vented and structural integrity is maintained by the composite shell structure. Compatible rigidizable materials include materials such as composite laminates and thin-walled aluminum laminates. Such in situ rigidized components can be deployed in various orbits and are designed to remain operational for typical spacecraft lifetimes of seven to fifteen years without concern for damage from micrometeorite impacts, radiation exposure, atomic oxygen exposure, or other environmental factors.

Rigidization of the tube can achieved through various methods, including, but not limited to thermal heating, passive cooling, ultraviolet exposure, inflation gas reaction, thin wall aluminum, and foam inflation.

With thermal heating, rigidization occurs by heating a composite system which comprises a thermoset matrix resin and a fiber reinforcement such as graphite. The resin hardens after being heated to a specified temperature and maintains its shape and structural properties after expulsion of the pressurization medium. The properties of the composite material are consistent with those of the composite materials typically used in spacecraft design. This system can be designed to cure from energy derived from the spacecraft, or by utilizing the sun's solar energy, or a combination of both. In a passive cooling method, the packed tube is warmed to a temperature where it is soft, then inflated, and deployed. Over time the structure releases its thermal energy to the environment and becomes rigid. Laminates employed with this method comprise composite materials which exhibit properties similar to the thermally heated composite laminates.

In an ultraviolet exposure method, the resin system hardens by contact with ultraviolet light. Use of this method requires the use of an ultraviolet resistant reinforcement that does not block the ultraviolet light from penetrating the entire laminate.

In an inflation gas reaction method, reactants which are contained in the inflation gas are used to pressurize the system. The inner wall of the laminate is permeable and allows migration of the reactants, and thus rigidization.

With a thin wall aluminum method, a laminate is manufactured with a layer of ductile aluminum positioned between outer layers of Kapton film. After inflation of the tube, the tube is rigidized by slightly yielding the aluminum to eliminate wrinkles in the laminate.

Finally, in a foam inflation method, the inflatable tube is deployed with an inner feed tube. Liquid chemicals are then pumped through the inner feed tube to fill the inflatable tube. The chemical reaction in the liquid foam reactants then expands and fills the tube, yielding a rigid element.

The present invention, therefore, by making possible the use of a variety of lightweight frame assemblies and devices for providing resistance to deployment, facilitates the deployment of a variety of lightweight space structures such as solar arrays. reflectors, sunshields, radars, antennas and concentrators. The apparatus is compatible with inflatable tubes made of various rigidizable materials such that the inflated tube, once deployed, can be rigidized and made self-supporting without internal pressurization. Although the invention's primary application is in the deployment of space structures, one skilled in the art can appreciate that the invention could be employed in other environments that require the deployment of a lightweight structure.

In even another embodiment, this invention relates generally to a method and an apparatus capable of deploying and subsequently supporting a lightweight space structure such as a solar array, reflector, sunshield, radar array, antenna, or concentrator. The invention relates more specifically to a method and lightweight apparatus that provide for the controlled deployment of an inflatable shell containing a space frame assembly, and the subsequent rigidization of the assembly so as to support the space structure.

Accordingly, this embodiment of the present invention is directed to a deployable space frame comprising a packageable, deployable, and rigidizable frame assembly; a packageable, deployable, and inflatable frame assembly shell disposed around the frame assembly; means for attaching the frame assembly shell to the frame assembly; and a shell inflator.

The present invention is also directed to a method of packaging and deploying the space frame. The method comprises (a) collapsing the frame assembly by packaging the shell to provide a packaged frame assembly/shell; (b) controllably deploying the frame assembly and the shell from the packaged frame assembly/shell by employing the shell inflator to inflate the shell while imparting a resistance to the shell to resist deployment such that the internal gas pressure required to continue deployment is sufficient to frilly inflate that portion of the shell to which gas has been introduced; (c) continuing to resist deployment until the frame assembly and the shell are deployed; (d) terminating the introduction of gas into the shell; (e) rigidizing the frame assembly; and (f) depressurizing the shell.

Thus, as the shell inflates, it deploys both the shell and the frame assembly contained therein in a controlled manner. Once the deployed shell is fully inflated, the frame assembly is rigidized to provide the support for the space structure. The shell is then depressurized and assumes an essentially passive role, apart from providing environmental protection for the rigidized frame assembly.

The advantages associated with this embodiment of the present invention are numerous. First, as indicated above, most conventional methods for deploying and supporting a space structure accomplish these tasks by means of either deployable truss structures consisting of relatively heavy elements, or inflatable structures. The space frame, however, requires substantially less material to accomplish the same structural performance as conventional inflatable structures, and is therefore lower in mass. The present invention, therefore, provides a lightweight means for both deploying and supporting a variety of space structures. Furthermore, by virtue of its inflatable means for deployment and rigidizable means for support, the invention comprises a lighter-weight system with fewer moving parts, thereby providing a higher degree of system reliability. Finally, the ability to collapse the structure for launch results in a packed volume which is minimal when compared with the aforementioned conventional structures.

Thus, while specifically facilitating as its primary application the deployment of lightweight space structures, the invention also more generally provides for the deployment of any lightweight structure that can then be maintained in place by the rigidity of the frame assembly.

The deployable space frame is an ultra-lightweight structural member that is simple to manufacture and readily tailorable to meet the structural requirements of a specific application. The space frame comprises a truss beam that comprises a series of connected box frames, or bays, manufactured from low-mass rigidizable composite tubes, enveloped within an inflatable outer shell. The deployable space frame requires substantially less material to accomplish the same structural performance as conventional cylindrical inflatable tube structures, and is therefore lower in mass. Furthermore, the deployed beam becomes a rigid structural member that does not require the support of inflation pressure to maintain its shape.

Figure 15:
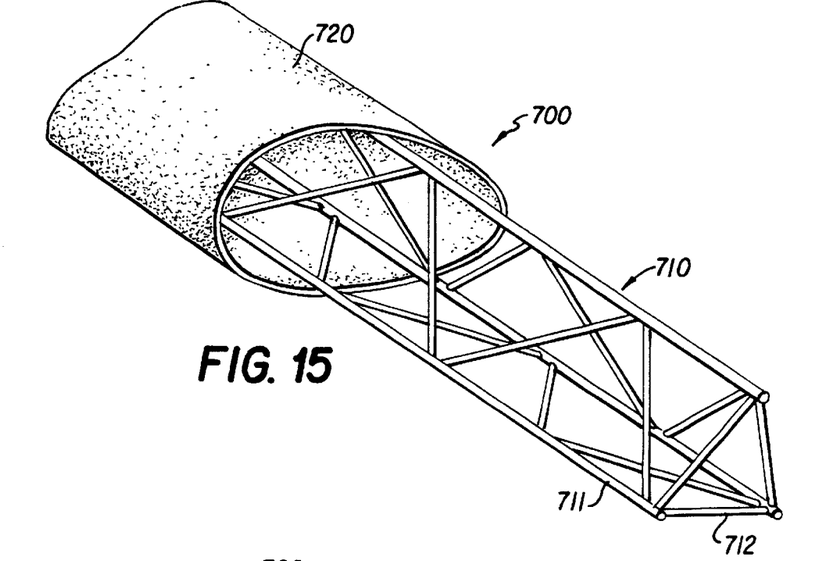
FIG. 15 is a partial perspective view of a space frame according to another embodiment of the present invention in which a shell and a frame assembly are in their deployed position.
Figures 16, 17, 18:
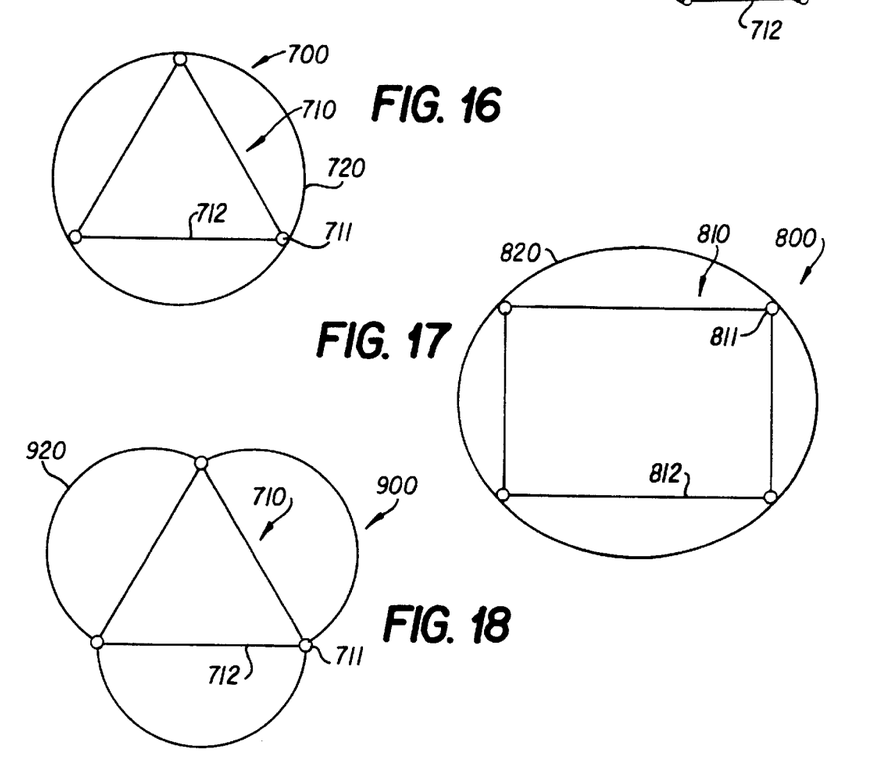
FIG. 16 is a cross-sectional view of the shell and the frame assembly depicted in FIG. 15.
FIG. 17 is a cross-sectional view of the shell and the frame assembly according to another embodiment of the present invention.
FIG. 18 is a cross-sectional view of the shell and the frame assembly according to another embodiment of the present invention.

Referring to FIGS. 15 and 16, a deployable space frame 700 constructed in accordance with another preferred embodiment of the present invention is shown in its deployed position. In this embodiment, the space frame 700 comprises a packageable, deployable, and rigidizable frame assembly 710 having an assembly base end and an assembly tip end; a packageable, deployable, and inflatable frame assembly shell 720 disposed around the frame assembly, the shell having a shell base end and a shell tip end; means for attaching the frame assembly shell to the frame assembly; and a shell inflator.

Frame assembly 710 comprises a plurality of connected thin-walled rigidizable composite struts which define a series of connected box frames, or bays, and has a polygonal cross-sectional shape (see FIG. 16). In the embodiment depicted in FIGS. 15 and 16, frame assembly 710 comprises first, second, and third longerons 711 extending from the assembly base end to the assembly tip end, and a plurality of connecting struts 712 interconnecting the first, second, and third longerons so as to form a triangular cross-sectional strut configuration.

Struts 711 and 712 can comprise various materials of construction and various shapes depending on the structural strength required. In a preferred embodiment, the struts are thin-walled composite laminate tubes of a thermosetting or thermoplastic material, with a wall thickness which is determined by the structural requirements of the specific application.

The means for attaching the frame assembly shell to the frame assembly serves to connect the struts 711 to the inside surface of the shell 720. These connections facilitate the proper packing and deployment of the shell as the frame assembly is packed and deployed. Suitable means for attaching the frame assembly shell to the frame assembly include tabs that are affixed to the inside surface of the shell and to the frame assembly. The tabs can be attached by means such as bonding and/or stitching.

The space frame properties are derived through the use of finite element beam modeling. Equivalent areas and moments of inertia are determined by applying unit loading to the finite element models, determining deflections and using standard structural mechanics equations to back calculate the properties. A geometrical configuration is determined such that the capacity of the space frame is approximately equal to the required compressive force. For example, in one application employing struts having a wall thickness of from 50 to 75 $\mu$m, and a diameter of from 0.64 to 1.27 cm, the frame assembly cross-sectional dimensions are such that the frame assembly cross section is capable of being inscribed within a 20.5 cm diameter circle.

Shell 720 is used for deployment, governs the deployed structure's straightness, and can provide some protection of the rigidized frame assembly elements from environmental degradation or thermal loads through the application of coatings, if required. The shell also provides the system's structure while in the inflated-only state. Often, this is the governing parameter in the system's design. The shell supports the loads from inflation and transfers those loads into the rigidizable space frame assembly to tension the members prior to rigidization.

The strength of the space frame during deployment is derived from the inflatable shell. Prior to rigidization, the inflatable shell governs the cross-sectional moment of inertia of the frame assembly, which makes it advantageous compared to other approaches such as an inflatable truss. Inflation of the shell yields a relatively high cross-sectional moment of inertia as compared to an inflatable truss because the moment of inertia is dependent on a cubic value of the radius. The larger radius of the inflatable portion of the space frame yields a relatively high stiffness during deployment as compared to a truss with small diameter inflatable members. Therefore, the shell provides the capability to withstand off-nominal loading during the deployment as well as during flight modes.

In a preferred embodiment, shell 720 comprises a polyimide film having a thickness of 12 $\mu$m, and in the embodiment depicted in FIGS. 15 and 16, has a substantially circular cross-sectional shape. Once the frame assembly is deployed and rigidized, the shell is depressurized and takes a passive role in system performance, apart from providing environmental resistance.

The shell inflator comprises a pressure-regulated gas source, such as nitrogen gas or a gas generated on board the spacecraft once on orbit, a plurality of redundant valves, a plurality of pressure sensors, and a plurality of pressure relief valves.

Referring to FIG. 17, a deployable space frame 800 constructed in accordance with another preferred embodiment of the present invention is shown in its deployed position. In this embodiment, frame assembly 810 comprises a plurality of connected thin-walled composite struts and has a polygonal cross-sectional shape. in the embodiment depicted in FIG. 17, frame assembly 810 comprises first, second, third, and fourth longerons 811 extending from the assembly base end to the assembly tip end, and a plurality of connecting struts 812 interconnecting the first, second, third, and fourth longerons so as to form a rectangular cross-sectional strut configuration.

The use of the term "shell" herein is meant to denote not only conduits such as the aforementioned shell having a substantially circular cross-sectional shape, but also includes all other cross-sectional shapes which are capable of being packaged and deployed according to the present invention. For example, the use of a rectangular cross-sectional strut configuration analogous to that depicted in FIG. 17 but in which the length of the rectangle is substantially greater than the width of the rectangle enables the approximation of a non-circular cross-sectional shell shape.

Furthermore, as depicted in FIG. 18, a deployable space frame 900 constructed in accordance with still another embodiment of the present invention comprises the same triangular cross-sectional strut configuration as the embodiment depicted in FIG. 16, but includes a shell 920 having a lobed cross-sectional shape. Additionally, even though the lobed cross-sectional shape embodiment has been depicted in conjunction with the triangular cross-sectional strut configuration, an analogous lobed cross-sectional shape could be employed with the rectangular cross-sectional strut configuration depicted in FIG. 17 (i.e. a shell having a lobe associated with each side of the rectangle). Finally, since, as indicated above, the frame assembly comprises a plurality of connected struts which define a polygonal cross-sectional shape, in the general case. a lobed cross-sectional shape can be employed in which the number of lobes is equal to the number of sides of the polygon.

The method of packaging and deploying a space frame 700, 800, or 900 (referred to herein in the description of the method as 700 for the purpose of brevity) comprises the following series of steps. First, frame assembly 710 is collapsed from the assembly tip end to the assembly base end by packaging shell 720 from the shell tip end to the shell base end to provide a packaged frame assembly/shell. In a preferred embodiment, the packaging step is accomplished by rolling the frame assembly-containing shell from the shell tip end to the shell base end. In another possible embodiment, however, the frame assembly-containing shell could be folded from the shell tip end to the shell base end in an accordian-like fashion.

Once on orbit, frame assembly 710 and shell 720 are controllably deployed from the packaged frame assembly/shell by employing the shell inflator to introduce an inflation gas into shell 720 so as to inflate the shell while imparting a resistance to the shell to resist deployment such that the internal gas pressure required to continue deployment is sufficient to fully inflate that portion of the shell to which said gas has been introduced. The introduction of the gas is continued and the resistance to deployment is maintained until frame assembly 710 and shell 720 are deployed.

Once frame assembly 710 and shell 720 are deployed, the introduction of gas into the shell is terminated, the frame assembly is rigidized, and the shell is depressurized.

The method of packing the space frame minimizes volume and ensures deployment reliability. The packing method is also low in mass, utilizes flight proven technology, and provides the required protection of the system during launch vibration.

For the purposes of exemplifying the method of packing, the following description is based on the deployment of a solar sail.

The solar sail system is packed on a lightweight composite honeycomb panel that is mounted to the spacecraft bus. The inflation system is enclosed in a small box mounted in the center of the honeycomb panel. Each of the bases of four inflatable shells is mounted to the inflation system box. Each inflatable shell containing the frame assembly is rolled from tip to base and positioned against the inflation system container on the honeycomb panel. The membranes of the solar sail are z-folded into small cubes and placed directly adjacent to the rolled shells/frame assemblies on the corners of the panel. The membrane stack is covered with a composite plate that is attached to the inflation system box. The membranes are attached to the cover plates and the tips of the shells and are thus supported in a predictable three-point attachment scheme that yields a planar quadrant.

The deployment sequence begins with the release of the soft pack that stows itself around the perimeter of the base of the honeycomb panel. This is followed by the introduction of inflation gas into the first set of opposing shells that begin to inflate while the other set is dormant. This facilitates the deployment of the solar sail in one direction at a time with the assistance of dispensing clips that release one z-fold of the material at a time. Controlled deployment of the solar sail material is important because it precludes the effects of trapped gas within the membrane or residual strain energy in the folds from allowing the sail to billow and become entangled on the spacecraft.

Once the deployment of the first set of booms is complete, the second set is initiated. The z-folds of the membrane are also retained by individual clips in this direction, at the base of the membrane, and dispense the membrane one z-fold at a time until full extension is reached. Rigidization is monitored by a thermocouple, or is a timed event. and once complete, the inflation gas in the shells is vented in a non-propulsive event.

While the inflation system can take several forms, a preferred embodiment is bottled $N_2$ gas, or cold gas from an existing source on the spacecraft, in order to reduce system risks. The shell is pressurized by a regulated gas source that is fed to the appropriate chambers at the required rates and times via valves that are actuated by computer or by human intervention, such as by radio signal, etc. Redundant valves and pressure sensing transducers are employed in the system to reduce risk, and the shell is fitted with relief valves to prevent over-pressurization.

Regardless of which configuration of the frame assembly is being employed, successful operation of the space frame depends on maintaining the stiffness of the inflatable shell while the frame assembly and shell are being controllably deployed. To achieve a controlled deployment, it is necessary to incorporate sufficient resistance to deployment such that the internal pressure required to continue deployment is high enough to adequately stiffen the portion of the shell that has already deployed. That is, the rate of deployment is controlled by a balance of forces between the resistance of the controlled deployment device and the flow rate and pressure of the inflation gas. During deployment, the internal pressure in the shell must be maintained at a prescribed level in order to yield the required skin stress in the inflatable shell's wall to react to loads on the system. This provides for a slow, controlled deployment which minimizes the possibility of film stress and film surface rubbing.

The roll-up embodiment of the present invention, which causes the least damage to the stowed shell and produces the smoothest deployment, comprises the rolled inflatable shell with a means for imparting resistance to deployment, i.e., a means for controlling the rate of unrolling when the inflation gas is introduced. The two general classes of deployment control which can be used in the roll-up embodiment include: i) means embedded in either the interior or exterior wall of the shell itself, and ii) means mounted at the deploying end of the shell.

Examples of the means for imparting resistance to unrolling which are embedded in the shell wall itself and which provide for adhesion of the rolled-up exterior shell wall surfaces to one another include a pressure sensitive adhesive, and a hook-and-loop fastener tape such as "VELCRO." In each of these means, the rolled shell remains in its packed state until the inflation pressure overcomes the resistance provided by the means and initiates deployment.

In a first embodiment of the means for imparting resistance to unrolling, a pressure sensitive adhesive is affixed to the exterior of the shell in longitudinal strips disposed at the 10 and 2 o'clock positions around the circumference of the shell. The adhesive can be used to control deployment as well as assist in maintenance of the package shape during launch vibration. The separation strength of the rolled shell from the outer wall of the shell, which dictates the internal pressure, is determined by the adhesive peel strength and the width of the strips of adhesive. The peel strength of this adhesive is constant over a wide temperature range about the predicted deployment temperature. The adhesive comprises high molecular weight compounds having high vacuum stability and therefore low outgassing characteristics. This embodiment requires only a few grams per linear meter of adhesive, and represents the lowest mass approach possible.

In a second embodiment of the means for imparting resistance to unrolling, a plurality of hook-and-loop fasteners embedded in the exterior wall of the shell can be used to control deployment and assist in maintenance of the package shape. This is accomplished by adding four independent strips of hook-and-loop fastener to the shell's exterior: two strips of hook at the 10 and 2 o'clock positions, and two strips of loop at the 8 and 4 o'clock positions. The shell is then flattened and rolled about the 9 to 3 o'clock axis. When inflation gas is introduced, the shell expands, causing the hook on the top side of the shell to detach from the loop on the bottom side of the shell, thereby allowing the shell to unroll. By selecting various grades and widths of hook-and-loop fastener, resistance to unrolling can be predicted and controlled, thus yielding the internal pressure required to provide the specified shell stiffness.

An example of a means for imparting resistance mounted at the deploying end of the shell is a means for imparting mechanical torque. Such devices function by torque reaction of the rolled shell on the inflated portion of the shell in order to control deployment of the system. This means can be, for example, a frictional device or a ratchet mechanism, such as a means for imparting torque through plastic deformation of a wire or tape of material. Such devices are typically low in mass and are highly reliable, but result in added tip mass which is unacceptable with applications in which bending loads are expected to be encountered from satellite attitude/reaction control system loads.

Successful deployment of the space frame is also dependent upon the ability of the frame assembly struts to be collapsible for packaging, and then deployable to shape when the shell is inflated. The struts, therefore, comprise a thermoplastic shape memory composite material. The thermoplastic shape memory composite will return to its manufactured "set" shape when heated above the second order transition temperature. Cooling the material below its second order transition temperature will then cause the material to become rigid. This allows the struts to be collapsed and packaged and later deployed to their final frame assembly shape.

In a preferred embodiment, the struts comprise thermoplastic composite laminate material which rigidizes by cold rigidization. Other possible embodiments of the strut materials, however, include materials such as ultraviolet radiation rigidizable materials and chemically hardened structures.

The functionality of the rigidization technique dictates the process by which the frame assembly is deployed and rigidized. First, the packaged frame assembly is preheated either by the heat given off by the spacecraft, by solar radiant energy, or by small heaters embedded in the packed volume. The packaged frame assembly would have good conduction paths and would be essentially the same temperature throughout the package. The preheating is necessary to warm the composite material above its second order transition temperature and provide it with some flexibility so as to allow it to be deployed via the inflation of the shell. During deployment, that portion of the packaged frame assembly which has not yet been deployed is housed in a multilayer insulation ("MLI") cover throughout its deployment. The cover contains the heat in the packaged frame assembly during the slow inflation process, thus keeping it in its flexible state until fully deployed.

Once the frame assembly emerges from the MLI cover it begins to give off heat and harden. The composite material's cooling rate is dictated by the insulating capability of the shell and any insulation layers added to the struts themselves. The insulation could be in the form of vapor deposited aluminum ("VDA") coated polyimide, and can be tailored to release heat at any rate to give the frame assembly structural capability, beyond that of the shell, even before deployment is complete. The MLI cover also controls the fluctuations in the temperature of the inflation gas and thus minimizes the quantity required if the system passes in and out of eclipse.

Both the thermoplastic and ultraviolet curable (thermoset) materials have been demonstrated with success in the manufacture and laboratory test of 3 meter long, 15 cm diameter booms. Advantages of thermoplastic materials, however, include the low coefficient of thermal expansion of the composite, low outgassing, ease of manufacture, reversibility to facilitate multiple functional tests in lab ambient conditions, and lower complexity.

Numerous thermoplastic materials are possible as matrix resins for use in composite struts. These materials are selected based on their performance properties, processing and manufacturing capability, and service temperature in various environments. In a preferred embodiment, the material is a modified thermoset that mimics a thermoplastic. Its properties include ease of processing, mechanical properties, thermal performance (softening point>70° C. for lab ambient testing and thermal margin on orbit), low creep, and ability to function as a shape memory plastic.

The resin can be applied to various reinforcements such as graphite, "KEVLAR," glass and/or ceramic fiber, poly(p-phenylene-2,6-benzobisoxazole)("PBO"), which is a rigid-rod isotropic crystal polymer, and "VECTRAN." Various weave styles are available with the required sizing to ensure wetting of the fibers and adhesion of the matrix resin. Hybrid weaves may also be a potential method of improving the reinforcement's capability while still retaining all of the flexibility required for manufacture and packaging.

An advantage of the present space frame is that a thermoplastic material will have a relatively high modulus unless heated to a temperatures which causes it to become very soft. This is an important consideration during deployment of high aspect ratio frame assemblies because the micro-wrinkles developed on the inboard side of the roll of a rolled shell can be impossible to remove with inflation pressure if the material has any significant stiffness (modulus) during deployment. The result, if this were to occur, would be curved structures. This concern is mitigated in the frame assembly because the length delta of the wall of the individual rolled members is relatively low and the truss members are under greater relative tension than conventional cylindrical constant wall thickness booms. The fact that the rigidizable material is also a shape memory plastic that is programmed to return to its original shape also mitigates the risk of curved structures.

The present invention, therefore, by making possible the use of a variety of lightweight frame assemblies and devices for providing resistance to deployment, facilitates the deployment of a variety of lightweight space structures such as solar arrays, reflectors, sunshields, radars, antennas and concentrators. Although the invention's primary application is in the deployment of space structures, one skilled in the art can appreciate that the invention could be employed in other environments that require the deployment of a lightweight structure.

The advantages of the space frame are numerous. First, the space frame minimizes the potential for premature rigidization, both pre- and post-launch. Since the frame assembly is manufactured from thermoplastic materials, it is impossible to have premature rigidization prior to deployment. Heating of the package during ascent from free molecular heating during launch will only preheat the assembly and is very desirable. The space frame is covered with MLI locally as well as in the area over the rolled-up section to prevent premature heat loss and rigidization during deployment. The area over the roll may also be covered with a high alpha/epsilon material, such as VDA-coated film, to promote the retention of heat during deployment. The cover would deploy to an area where it would allow the tip of the frame assembly to rigidize when the structure was fully deployed. Therefore, the potential for premature rigidization is extremely low.

Secondly, the space frame provides tolerance to increasingly hostile environments, in particular, increased thermal loads, radiation, and spacecraft-induced contamination, as well as insensitivity to close proximity to either warm or cold structures. Environmental protection of the frame assembly is provided by the resiliency of the rigidizable materials and the protective capability of the MLI that locally wraps the struts, or the shell that also acts as part of the insulation blanket.

Thirdly, the space frame minimizes stowage volume and accommodates stowage in different stowage shapes.

While only certain preferred embodiments of this invention have been shown and described by way of illustration, many modifications will occur to those skilled in the art and it is, therefore, desired that it be understood that it is intended herein to cover all such modifications that fall within the true spirit and scope of this invention.

For example, the space frame can be tailored to meet the structural requirements of a specific application. Each of these modifications has little effect on the manufacturing process and cost of the system because the manufacturing techniques can easily accommodate many changes. Several design variables of the space frame which can be altered to optimize the structural characteristics include, for example, tapering the shell diameter from base to tip; resizing bays by altering the length of the struts and interface locations to the longerons; altering the material (fiber type, fiber orientation, resin type) and thickness of the structural members; and changing the diameter of the structural members to effect the cross-sectional moment of inertia.

Optimization of the space frame design by changing materials, processing techniques or geometry will also result in reduced linear mass densities of the space frame. The resulting reductions in system mass would result in a reduction in spacecraft bus mass and/or spacecraft expendables.

By way of further example of modifications within the scope of this invention, while the frame assembly has been described as having either a triangular (FIGS. 15, 16, and 18) or a rectangular (FIG. 17) cross-sectional configuration, another embodiment could comprise any other polygonal configuration (effected by altering the number of longerons) capable of being packaged and deployed, and of providing the requisite structural support.

By way of further example of modifications within the scope of this invention, while the shell has been described as having a substantially circular cross-sectional shape in the first and second preferred embodiments, other embodiments could comprise other shapes capable of being packaged and deployed, and of accommodating the configuration of the frame assembly, such as, for example, the aforementioned lobed configuration of the third preferred embodiment.

By way of further example of modifications within the scope of this invention, while the space frame has been described in the context of a single straight frame, another embodiment could comprise a configuration in which a plurality of space frames are interconnected to provide a faceted torus or similar shape.

Another possible embodiment could comprise a configuration in which a plurality of space frames are interconnected to provide a larger truss assembly. In the truss embodiment, the space frame comprises a plurality of packageable, deployable, and rigidizable frame assemblies, each of the assemblies having an assembly first end and an assembly second end; a plurality of packageable, deployable, and inflatable frame assembly shells each corresponding to each of the plurality of frame assemblies, each of the shells disposed around each of the corresponding frame assemblies, and each of the shells having a shell first end and a shell second end; means for attaching each of said shells to a corresponding one of each of said frame assemblies; means for connecting said assembly second end to said assembly first end for each of said plurality of frame assemblies, and means for connecting said shell second end to said shell first end for each of said plurality of shells; and a shell inflator for inflating the plurality of shells.

What is claimed is:

1. A linear actuation apparatus comprising:
    an inflatable tube having a first deployable end, and a second fixed end terminating in an attachment to a mounting surface;
    a rotatable mechanism attached by a fixed shaft to said first deployable end to impart axial force from the inflation of the inflatable tube;
    a sleeve attached to said fixed shaft to constrain that portion of the inflatable tube which has been inflated; and
    a means for imparting resistance of said inflatable tube to deployment such that the internal pressure required to continue deployment is sufficient to stiffen that portion of the inflatable tube which has been inflated.

2. The linear actuation apparatus according to claim 1, wherein said sleeve is slidable.

3. The linear actuation apparatus according to claim 1, wherein said sleeve is rollable.

4. The linear actuation apparatus according to claim 1, wherein said means for imparting resistance is one or a plurality of hook-and-loop fasteners attached to an exterior surface of the inflatable tube such that inflation pressure is required to detach a hook on a top side of the tube from a loop on a bottom side of the tube.

5. The linear actuation apparatus according to claim 1, wherein said means for imparting resistance is one or a plurality of constant force springs attached to an interior surface of the inflatable tube such that inflation pressure is required to unroll the springs.

6. The linear actuation apparatus according to claim 1, wherein said means for imparting resistance is a mechanical apparatus that requires torque to rotate the rotatable mechanism about the fixed shaft.

7. The linear actuation apparatus according to claim 6, wherein said mechanical apparatus comprises a take-up spool, a supply spool, first and second spool housings containing bearings, and a ductile wire capable of being transferred from said supply spool to said take-up spool.

8. The linear actuation apparatus according to claim 1, wherein said tube has a circular cross-sectional shape.

9. The linear actuation apparatus according to claim 1, wherein said tube has a non-circular cross-sectional shape and further comprises spars to provide said non-circular cross-sectional shape.

10. The linear actuation apparatus according to claim 1, further comprising an assembly attached to said fixed shaft to support a deployable object.

11. The linear actuation apparatus according to claim 1, further comprising a means to subsequently rigidize said inflatable tube.

12. A method of linear actuation comprising:

controllably deploying an inflatable tube having a first deployable end, and a second fixed end terminating in an attachment to a mounting surface by introducing an inflation gas into said second fixed end of the inflatable tube;

imparting axial force resulting from the inflation of said inflatable tube by a rotatable mechanism attached by a fixed shaft to said first deployable end;

constraining that portion of said inflatable tube which has been inflated by a sleeve attached to said fixed shaft; and imparting resistance of said inflatable tube to deployment such that the internal pressure required to continue deployment is sufficient to stiffen that portion of the inflatable tube which has been inflated.

13. The method of linear actuation according to claim 12, further comprising a step of rigidizing said inflatable tube after the tube has been deployed.

* * * * *